Patented Apr. 19, 1927.

1,625,641

UNITED STATES PATENT OFFICE.

ROBERT DOUGLAS AND HUGO G. LOESCH, OF ROCHESTER, NEW YORK, ASSIGNORS TO DOUGLAS-PECTIN CORPORATION, OF ROCHESTER, NEW YORK, A CORPORATION OF NEW YORK.

EMULSIFICATION OF OILS AND FATS AND PRODUCTS MADE THEREFROM.

No Drawing.  Application filed September 4, 1923. Serial No. 660,902.

Our invention relates to new products adapted for use not only in food preparations but also in the arts, as for instance in pharmaceutical preparations and is based upon our discovery that oils and fats whether vegetable, animal or mineral are readily emulsified by small quantities of pectin which is the jellifying principle or material of fruits. Such emulsions made from edible oils or fats and pectin properly flavored constitute valuable food products which not only remain stable and keep in good condition under ordinary climatic conditions but are capable of being Pasteurized at relatively high temperatures without material change. Furthermore the quantity of the emulsifying agent used is so small as not to be noticeable, and while the preparation of such food products constitutes one of the primary objects of our invention, the emulsification by means of this agent of other oils and fats for use as lotions, salves, laxatives or otherwise is believed to be a valuable contribution to the arts and sciences.

Hitherto pectin has been only used as the jellifying agent in the manufacture of fruit jams, jellies and marmalades (U. S. Patents Nos. 1,082,682; 1,235,666 and 1,304,166). We have discovered that pectin, the jellifying principle of fruits; emulsifies vegetable and animal oils and fats, and mineral oils, forming smooth, firm and stable emulsions, making it invaluable as an emulsifying agent in food products, such as mayonnaise and other salad dressings; and in medicinal and other products. Its use in emulsifying oils, particularly in food products, makes unnecessary the use of eggs or milk or cream, which hitherto have been the recognized emulsified agents for food products.

The presence of these agents in such products makes them readily putrescible and prevents the use of ordinary methods of preservation by Pasteurization, owing to the fact that such treatment produces curdling and separation of the oil on subjecting the finished product to the required temperature.

Now, we have also discovered that pectin-oil emulsions can be subjected to extremes of heat and cold without curdling or separation of the oil, and can be Pasteurized in hermetically sealed containers and will then remain stable and wholesome indefinitely under all climatic conditions.

It is well known that pectin can be obtained from many varieties of fruits. As an example, pectin suitable for use for our purpose may be obtained by treating in the known manner with alcohol, or other precipitants, a pectin concentrate made for example in accordance with the aforementioned patents, U. S. Nos. 1,082,682 and 1,235,666 and drying the precipitate. A 5% solution of this pure, dry pectin in water is a convenient and desirable pectin concentration for our purpose, although higher and lower concentrations of pectin can be used as may be necessary for different fats and oils. It is desirable, however, not to begin with an initial concentration of pectin much below 3% when adding the oil, otherwise proper emulsification of the oil is not readily obtained.

The vegetable oils and fats, cottonseed oil, linseed oil, castor oil, mustard oil, corn oil, palm oil, olive oil, peanut oil, cocoanut oil, soy bean oil, cocoa butter, almond oil, etc. are readily emulsified with pectin solution; also animal oils and fats such as butter fat, lard, tallow, cod-liver oil, neat's-foot oil, fish oils, etc.; also mineral oils, such as paraffin oil, etc. Such emulsification can be quickly obtained by adding slowly with constant stirring and mixing to one part, say, of 5% pectin solution, 1 to 4 or more parts of the oil according to the character of the emulsion desired, whereupon the emulsion immediately begins to form on the first addition of the oil and continues to do so and to thicken to a firm stable emulsion. As the emulsion thickens it may be thinned, if so desired, with water or any suitable solution or liquid. As already noted above, higher or lower concentrations of pectin may be used as necessary. Solid fats should be melted and held at a temperature necessary to maintain them in liquid form while the emulsification is taking place. The proportions used for vegetable, animal or mineral oils are substantially the same.

In the making of salad dressing such as mayonnaise, as an example, to 10 parts of a 5% pectin solution in water is added and intimately mixed the desired amounts of salt, sugar, mustard and other spices and flavoring and then there is added slowly and with stirring and mixing 76 parts of the desired salad oil, gradually thinning the emulsion with a total of 14 parts of vinegar or lemon juice as it thickens. This mayonnaise can be Pasteurized in hermetically sealed containers and will keep indefinitely in any climate. It will not curdle or separate on heating or by chilling.

It is understood that in the example given above, the figures are purely illustrative, and are not rigid and can be varied to suit individual requirements.

There are many other adaptations and uses for pectin-oil emulsions, such as the manufacture of butter substitutes, made with vegetable or vegetable and animal oils and fats; medicinal preparations made with mineral oil, such for instance as laxatives or vegetable or animal fats and oils, such as cod-liver oil emulsion etc., but the above is deemed sufficient to illustrate the production of the varied uses of pectin-oil emulsions.

In emulsifying fats such for instance as butter or butter substitutes, it is advisable that they be melted or reduced to a liquid or semi-liquid condition by heating and added to the pectin solution in the manner described.

Pharmaceutical lotions or salves comprising linseed oil and other ingredients, and also laxatives comprising mineral oil or liquefied petroleum jelly, can be emulsified and rendered stable by the addition of the pectin in the manner described without impairing their therapeutic qualities.

We claim as our invention:

1. A pectin-stablized oil or fat emulsion.
2. A pectin-stabilized vegetable oil or fat emulsion.
3. A Pasteurized emulsion comprising an oil or fat and pectin.
4. A Pasteurized emulsion comprising a vegetable oil or fat and pectin.
5. A Pasteurized emulsion comprising an oil or fat and pectin in substantially the proportions of a five per cent solution of pectin, and not exceeding four parts of the oil or fat.
6. A pectin-vegetable oil mayonnaise characterized by its property of remaining stable under high Pasteurization temperatures.
7. The improved step in the process of manufacture of a food dressing consisting in emulsifying vegetable oils or fats by means of a solution of pectin.
8. The process of emulsifying oils or fats, which consists in adding these in liquid form to pectin in water solution with stirring and mixing.
9. The improved step in the process of manufacture of a food dressing consisting in emulsifying a combination of vegetable and animal oils or fats by means of a solution of pectin.
10. The emulsification of oils and fats caused by mixing therewith a solution of pectin.

ROBERT DOUGLAS.
HUGO G. LOESCH.